(12) United States Patent  (10) Patent No.: US 6,505,303 B1
Arima  (45) Date of Patent: Jan. 7, 2003

(54) COMMUNICATIONS NODE, INFORMATION EQUIPMENT INCLUDING THE SAME AND NETWORK SYSTEM

(75) Inventor: Yukio Arima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/464,769

(22) Filed: Dec. 16, 1999

(30) Foreign Application Priority Data

Dec. 17, 1998  (JP) .......................................... 10-358890

(51) Int. Cl.$^7$ ................................................ G06F 1/32
(52) U.S. Cl. ........................ 713/324; 713/323; 370/311
(58) Field of Search ................................ 713/320, 323, 713/324; 370/217, 220, 221, 222, 351, 311; 709/227, 251, 252

(56) References Cited

U.S. PATENT DOCUMENTS

| 5,579,486 | A | | 11/1996 | Oprescu et qal. | |
|---|---|---|---|---|---|
| 5,630,173 | A | | 5/1997 | Oprescu | |
| 5,754,789 | A | | 5/1998 | Noswatzyk et al. | |
| 5,996,083 | A | * | 11/1999 | Gupta et al. | 713/322 |
| 6,131,167 | A | * | 10/2000 | Cruz | 713/300 |
| 6,346,873 | B1 | * | 2/2002 | Suzuki et al. | 340/3.41 |
| 6,366,143 | B1 | * | 4/2002 | Liu et al. | 327/142 |

FOREIGN PATENT DOCUMENTS

| JP | 63-246054 | 10/1988 |
|---|---|---|
| JP | 4-90231 | 3/1992 |
| JP | 5-276183 | 10/1993 |

* cited by examiner

Primary Examiner—Thomas Lee
Assistant Examiner—Thuan Du
(74) Attorney, Agent, or Firm—McDermott, Will & Emery

(57) ABSTRACT

In a network system, the data transfer efficiency attained when a given port is placed in a sleeping state is improved. A first node having received a request for setting a port thereof to a sleeping state notices transition to a sleeping state from that port. A second node having received notice of the transition to a sleeping state sets a port thereof at which the notice is received to a sleeping state, sends the node number of a node to which data is transferable from that port as communication disable node information from another port thereof, and forms a local network. In this manner, data transfer can be conducted independently within the local network.

14 Claims, 16 Drawing Sheets

⟨Sleep process⟩

⟨Communication disable node information receiving process⟩

⟨Communication enable node information receiving process⟩

⟨Local root node setting signal receiving process⟩ ns and Network System

BACKGROUND OF THE INVENTION

The present invention relates to a computer network system and a communications node included in the network system, and more particularly, it relates to a technique to efficiently controlling transition to a sleeping state and return to a communication enable state of a port in a channel interconnection network system.

In a computer system, a network connected through cables or the like is generally formed so that data can be transferred among individual components. A network system is realized by interconnecting communications nodes of the respective components through buses. In general, all communications nodes included in a network system are operated in accordance with predetermined protocol so as to attain consistency in communication between the nodes. In some of such protocol, in consideration of power saving, even when a node or a port is placed in a communication disable state such as a sleeping state, a bus is reconstructed without fail so that a transfer operation can be continuously conducted between nodes in a communication enable state.

An example of such protocol is "P1394a Draft Standard for a High Performance Serial Bus" of Microprocessor and Microcomputer Standards Committee of the IEEE Computer Society. In this protocol, when a given port enters a sleeping state, a communications node connected to this port sets all of its ports to a sleeping state. As a result, all the ports of communications nodes connected to the port that is first placed in a sleeping state as well as all the ports of communications nodes disposed between each port of these communications nodes and the ends of buses are placed in a sleeping state. Also in the case where a given port is returned from a sleeping state to a communication enable state, similar procedures are adopted, so that the network system can be initialized after placing all the ports of all the communications nodes in a communication enable state.

For example, in a network system shown in FIG. 1, when a port 3a of a node 3 enters a sleeping state, a node 4 connected to the port 3a sets all of its ports, namely, ports 4a, 4b and 4c, to a sleeping state. Furthermore, a node 5 connected to the port 4b sets its own port 5a to a sleeping state, and a node 6 connected to the port 4a sets its own port 6a to a sleeping state. As a result, the network system of FIG. 1 attains a state as shown in FIG. 17, in which the ports in a sleeping state are shown with black circles.

In the state shown in FIG. 17, when the port 3a of the node 3 returns from a sleeping state to a communication enable state, the node 4 returns its own ports 4a, 4b and 4c to a communication enable state. Also, the node 5 returns its own port 5a to a communication enable state and the node 6 returns its own port 6a to a communication enable state. Furthermore, the nodes 3, 4 and 5 output a bus initialization signal after a predetermined period of time, so as to initialize and reconstruct the entire network system.

As is shown in FIG. 17, when a given port goes into a sleeping state in the conventional network system, the ports of all communications nodes subsequent to this port are placed in a sleeping state. Therefore, data cannot be transferred between the communications nodes subsequent to the port in a sleeping state.

Furthermore, in the conventional network system, after a port in a sleeping state is returned to a communication enable state, the network is always initialized on the assumption that the architecture has been changed while the port is in a sleeping state. However, since the initialization operation interrupts data transfer, a frequently conducted initialization operation is undesirable in consideration of data transfer efficiency.

SUMMARY OF THE INVENTION

An object of the invention is, in a network system including plural communications nodes, improving data transfer efficiency attained in setting a port to a sleeping state or returning a port to a communication enable state as compared with that attained by the conventional technique.

Specifically, the communications node included in a network system of this invention comprises a plurality of ports: and means for conducting, when notice of transition to a sleeping state is received at one of the ports or when one of the ports is to be set to a sleeping state, an operation for placing the port in a sleeping state and an operation for forming a local network capable of independent internal data transfer together with another node to which data is transferable from a port other than the sleeping port.

According to the invention, when notice of transition to a sleeping state is received at a port, or when a port is to be set to a sleeping state, a communications node sets the port to a sleeping state and forms a local network together with another node to which data can be transferred from a port thereof other than the port set to a sleeping state. As a result, data can be transferred from the port other than the port in a sleeping state, and the node to which data can be transferred from the port other than the port in a sleeping state can be kept in a data transfer enable state because its port is not placed in a sleeping state. Accordingly, the data transfer efficiency attained in setting a port to a sleeping state can be improved as compared with that attained by the conventional technique.

Preferably, the operation for forming the local network includes steps of recognizing a node to which data is transferable from the sleeping port as a communication disable node; and sending a node number of the communication disable node from a port other than the sleeping port as communication disable node information.

Also preferably, the operation for forming the local network includes a step of, when the sleeping port is a root port, setting either the communications node or another node to which data is transferable from a port other than the sleeping port as a local root node for controlling arbitration in the local network. Furthermore, the communications node preferably further comprises means for setting all of the ports to a sleeping state when it is impossible to set a local root node.

Moreover, the communications node preferably further comprises means for conducting, when the sleeping port receives notice of return to a communication enable state or when the sleeping port is to be returned to a communication enable state, an operation for returning the sleeping port to a communication enable state and an operation for canceling the local network formed by the communications node and another node to which data is transferable from a port other than the returned port.

Furthermore, the operation for canceling the local network preferably includes steps of determining whether or not initialization has occurred while the local network is formed; and sending an initialization signal from all of the ports when it is determined that initialization has occurred and not sending an initialization signal when not. In this manner, in canceling a local network, the communications node sends an initialization signal from all of its ports when it recognizes that initialization has occurred while the local network is formed, and does not send an initialization signal when it recognizes that initialization has not occurred. Therefore, network initialization is conducted merely when initialization has occurred in the local network, namely, when there is a possibility of change in the structure of the local network. Accordingly, unnecessary initialization can be avoided, resulting in improving the data transfer efficiency.

The communications node preferably further comprises an initialization occurrence flag to be set when another port receives the initialization signal while any port is in a sleeping state, and in the operation for canceling the local network, it is preferably determined that initialization has occurred if the initialization occurrence flag is set and that initialization has not occurred if the initialization occurrence flag is not set.

Furthermore, the operation for canceling the local network preferably includes steps of recognizing a node to which data is transferable from the returned port as a communication enable node; and sending a node number of the communication enable node from a port other than the returned port as communication enable node information.

Alternatively, the information equipment of this invention comprises the above-described communications node of this invention and has a structure connectable to a network system.

Alternatively, the network system of this invention comprises plural communications nodes, and when each of the communications nodes receives notice of transition to a sleeping state at a port thereof or when the communications node is to set a port thereof to a sleeping state, the communications node places the port in a sleeping state, and forms a local network capable of independent internal data transfer together with another node to which data is transferable from a port thereof other than the sleeping port.

In this network system, a communications node having received notice of transition to a sleeping state at a port thereof or a communications node setting a port thereof to a sleeping state sets the port in a sleeping state and forms a local network together with another node to which data can be transferred from a port thereof other than the port set to a sleeping state. As a result, data can be transferred from the port other than the port set to a sleeping state, and the node to which data can be transferred from the port other than the port set to a sleeping state can be kept in a data transfer enable state because its port is not in a sleeping state. Accordingly, the data transfer efficiency in setting a port to a sleeping state can be improved as compared with that attained by the conventional technique.

Preferably, in forming the local network, the communications node recognizes a node to which data is transferable from the sleeping port as a communication disable node and sends a node number of the recognized communication disable node from a port thereof other than the sleeping port as communication disable node information, and each communications node receiving the communication disable node information stops communicating with the node having the node number included in the communication disable node information.

Furthermore, when each of the communications nodes receives notice of return to a communication enable state at a port thereof or when the communications node is to return a port thereof to a communication enable state, the communications node preferably returns the port to a communication enable state, and cancels the local network formed together with another node to which data is transferable from a port thereof other than the returned port.

Moreover, in canceling the local network, the communications node preferably recognizes a node to which data is transferable from the returned port as a communication enable node, and sends a node number of the recognized communication enable node from a port thereof other than the returned port as communication enable node information, and each communications node receiving the communication enable node information preferably allows to communicate with the node having the node number included in the communication enable node information.

In addition, each communications node receiving the communication enable node information preferably determines whether or not any port thereof is a communication disable port, and when any port thereof is a communication disable port, the communications node preferably recognizes a node to which data is transferable from the communication disable port as a communication disable node, and sends a node number of the recognized communication disable node from a port thereof other than the communication disable port as communication disable node information.

DETAILED DESCRIPTION OF THE INVENTION

First, terms used herein will be defined as follows:

A "root node" means a communications node for mediating arbitration in a network system. Merely one root node is determined in a network system in an initialization process conducted in turning power on or resetting. A "root port" (or "parent port") means a port connected to a path to a root node among ports of each communications node. A "disable port" means a root port that is originally a root port and has been placed in a non-root port state. A port other than a root port and a disable port is designated as a child port.

Furthermore, the following terms are also used for describing the present invention.

A "local network" means a partial network divided by a communications node or port not in a communication enable state. Within a local network, data transfer can be independently conducted. A "local root node" means a communications node for mediating arbitration in a local network, and merely one local root node is determined in a local network. Furthermore, a port connected to a path to a local root node among ports of each communications node is also designated as a "root port".

Now, the basic concept of the invention will be described.

Figure 1:
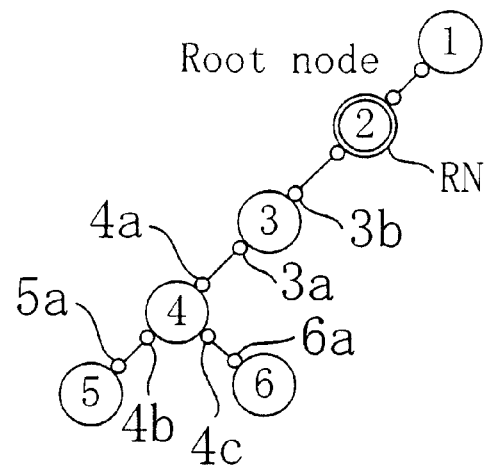
FIG. 1 is a conceptual diagram for showing the structure of a network system including plural communications nodes.

FIG. 1 is a conceptual diagram for showing the structure of a network system including plural communications nodes connected through buses. In FIG. 1, each circle corresponds to a communications node, and a numeral value in each circle indicates a node number of the communications node. A line connecting the circles indicates a bus between the communications nodes. Also, a small circle in contact with each circle corresponding to a node indicates a port of the node. In FIG. 1, it is assumed that a node 2 surrounded with a double circle is determined as a root node RN.

Each communications node is connected to its host, so as to communicate with another communications node in accordance with predetermined protocol in response to a request from the host. The host can be any device, such as a keyboard, a disk drive, a printer and a CPU, as far as it is necessary to communicate with other components. A communications node and its host together constitute information equipment having a structure connectable to a network system.

In the network system of FIG. 1, it is assumed that a node 3 receives from its host a transition request for placing a port 3a in a sleeping state. The node 3 notices the transition to a sleeping state from the port 3a. A node 4, which has received the notice of the transition to a sleeping state at a port 4a, places the port 4a in a sleeping state when the port 4a can be set to a sleeping state, and further operates so as to form a local network capable of independent internal data transfer together with nodes 5 and 6 to which data can be transferred from its ports other than the port 4a, namely, ports 4b and 4c. Furthermore, the node 3 also places the port 3a in a sleeping state and operates so as to form a local network capable of independent internal data transfer together with nodes 1 and 2 to which data can be transferred from its port other than the port 3a, namely, a port 3b.

Figure 2:
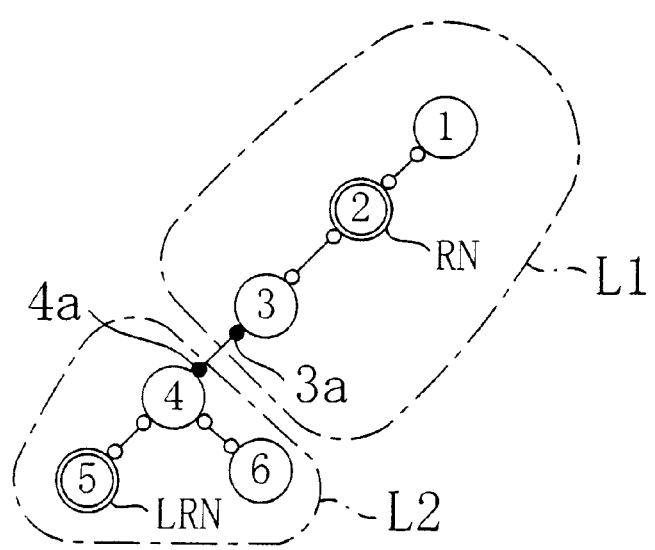
FIG. 2 is a diagram for showing a result of executing an operation according to the invention by the respective communications nodes in the network of FIG. 1.

As a result of this operation, the network system of FIG. 1 is placed in a state as shown in FIG. 2. Specifically, the port 3a of the node 3 and the port 4a of the node 4 are placed in a sleeping state but the other ports are not in a sleeping state. Also, the nodes 1, 2 and 3 together form a first local network L1 and the nodes 4, 5 and 6 together form a second local network L2. Since the second local network L2 has no root node, the node 5 having a function as a root node is set as a local root node LRN for controlling arbitration. Within each of the first and second local networks L1 and L2, data transfer can be independently conducted.

Now, an embodiment of the invention will be described.

As a premise in this embodiment, the following rules are adopted for realizing a communications node: Each communications node has one or plural ports; and each port has information for recognizing whether or not it is a root port.

Also, procedures in bus arbitration and data communication will not be described in detail in the following description. This is because a variety of methods are generally known for these processes, and hence, the processes can be easily realized by those skilled in the art and there is no need to adopt a specific method for bus arbitration in order to practice the invention. It is, however, assumed for the sake of simplification that the bus arbitration and data communication are herein conducted by a bus arbitration method used in IEEE 1394 unless described otherwise.

<Sleep Process>

Figure 3:
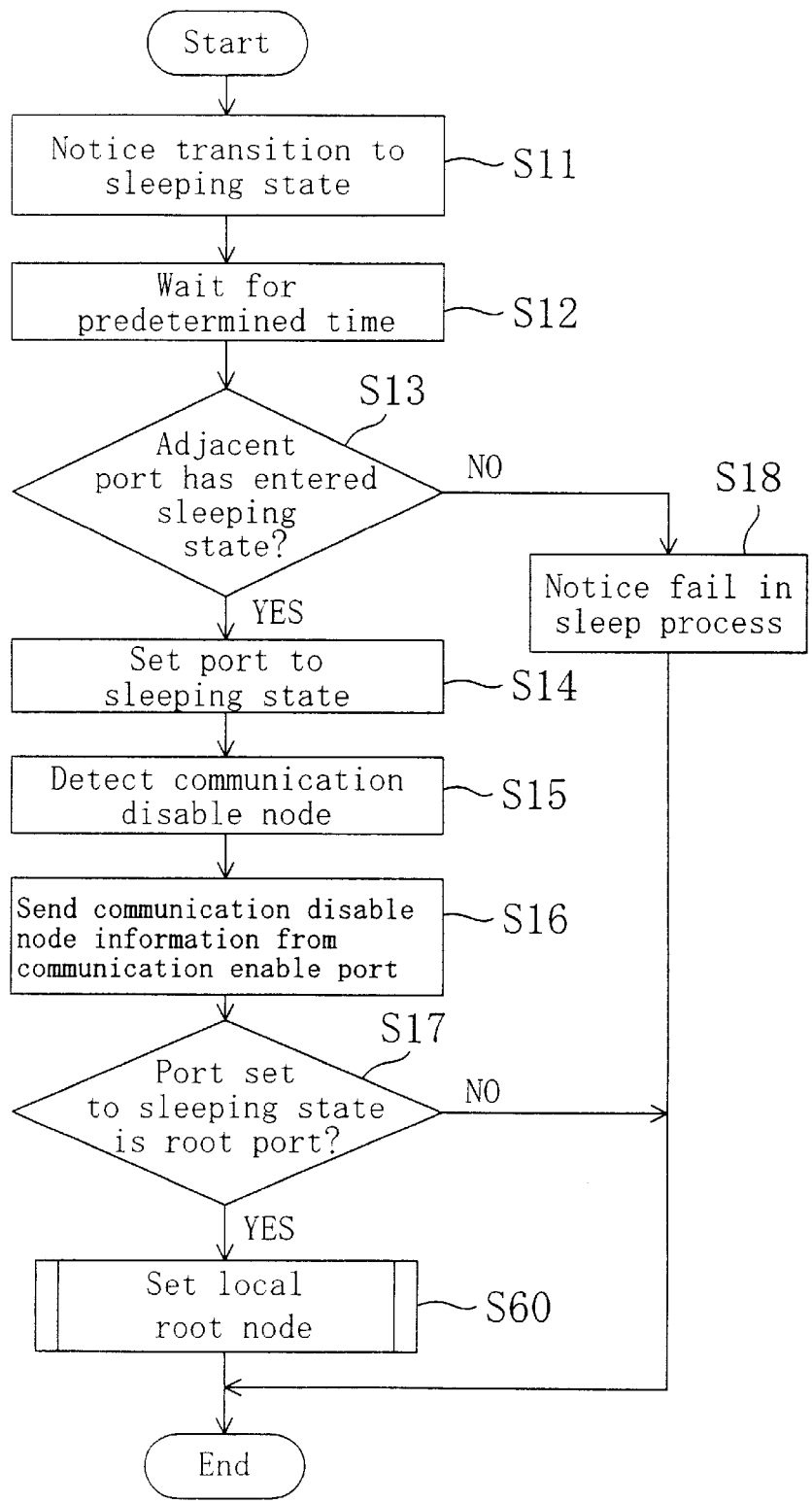
FIG. 3 is a flowchart for showing detailed procedures in a sleep process in the operation of a communications node according to embodiment of the invention.

FIG. 3 is a flowchart for showing procedures in a sleep process, namely, a process for actively placing a given port in a sleeping state, in the operation of a communications node. When a request for transition to a sleeping state occurs, a communications node executes the sleep process shown in FIG. 3.

First, in step S11, the transition to a sleeping state is noticed a port (adjacent port) of an adjacent node connected to the port to be placed in a sleeping state. This notice is sent by, for example, lowering an electrical bias previously applied to a cable for connecting these ports to be smaller than a predetermined value. It is preferred that this notice is not sent by using a specific packet data. Furthermore, any other noticing method can be adopted as far as a communication disable state such as a sleeping state accompanied by no change in cable connection can be distinguished from a communication disable state derived from physical disconnection of a cable.

Next, the procedure proceeds to step S12 for waiting for a predetermined period of time. A waiting time is set to a value sufficient for the adjacent node recognizing the notice of the transition to a sleeping state and responding to this notice. After waiting for a predetermined period of time, it is determined in step S13 whether or not the adjacent port has entered a sleeping state. When the adjacent port has entered a sleeping state, the procedure proceeds to step S14, in which the port is set to a sleeping state. When not, the procedure proceeds to step S18, in which the fail of the transition to a sleeping state is noticed the host, and the sleep process is completed.

When the port is placed in a sleeping state in step S14, data cannot be transferred to communications nodes subsequent to this port. Therefore, in step S15, a node to which data can be transferred from this port is detected as a communication disable node. In step S16, the node number of the communication disable node detected in step S15 is sent as communication disable node information from a communication enable port other than the port placed in a sleeping state. A format of the communication disable node information can be, for example, a packet data including a header for indicating that it is the communication disable node information and the node number of a communication disable node.

In order to easily detect a communication disable node, it is preferred that each communications node previously stores the number of a node to which data can be transferred from each of its ports in initialization of the bus. For example, in the protocol according to IEEE 1394, in the initialization of a bus, each communications node sends node information, which includes a node number, the number of its ports, a transfer rate and information whether or not it can work as a root node, to all nodes connected to the bus in an order uniquely determined in accordance with the bus architecture. In this case, when each communications node stores the contents of the received node information correspondingly to a port having received the node information, the detection of a communication disable node in step S15 can be easily conducted on the basis of the stored node information.

Next, it is determined in step S17 whether or not the port placed in a sleeping state is a root port. When the port placed in a sleeping state is a root port, a local network including this communications node has no root node. Therefor, it is necessary to set a local root node for mediating arbitration in the local network. Accordingly, when the port placed in a sleeping state is determined as a root port, the procedure proceeds to step S60 for conducting a "local root node setting process" (described in detail below), and the sleep process is then completed. On the other hand, when the port placed in a sleeping state is not a root port, the sleep process is directly completed.

<Return Process>

Figure 4:
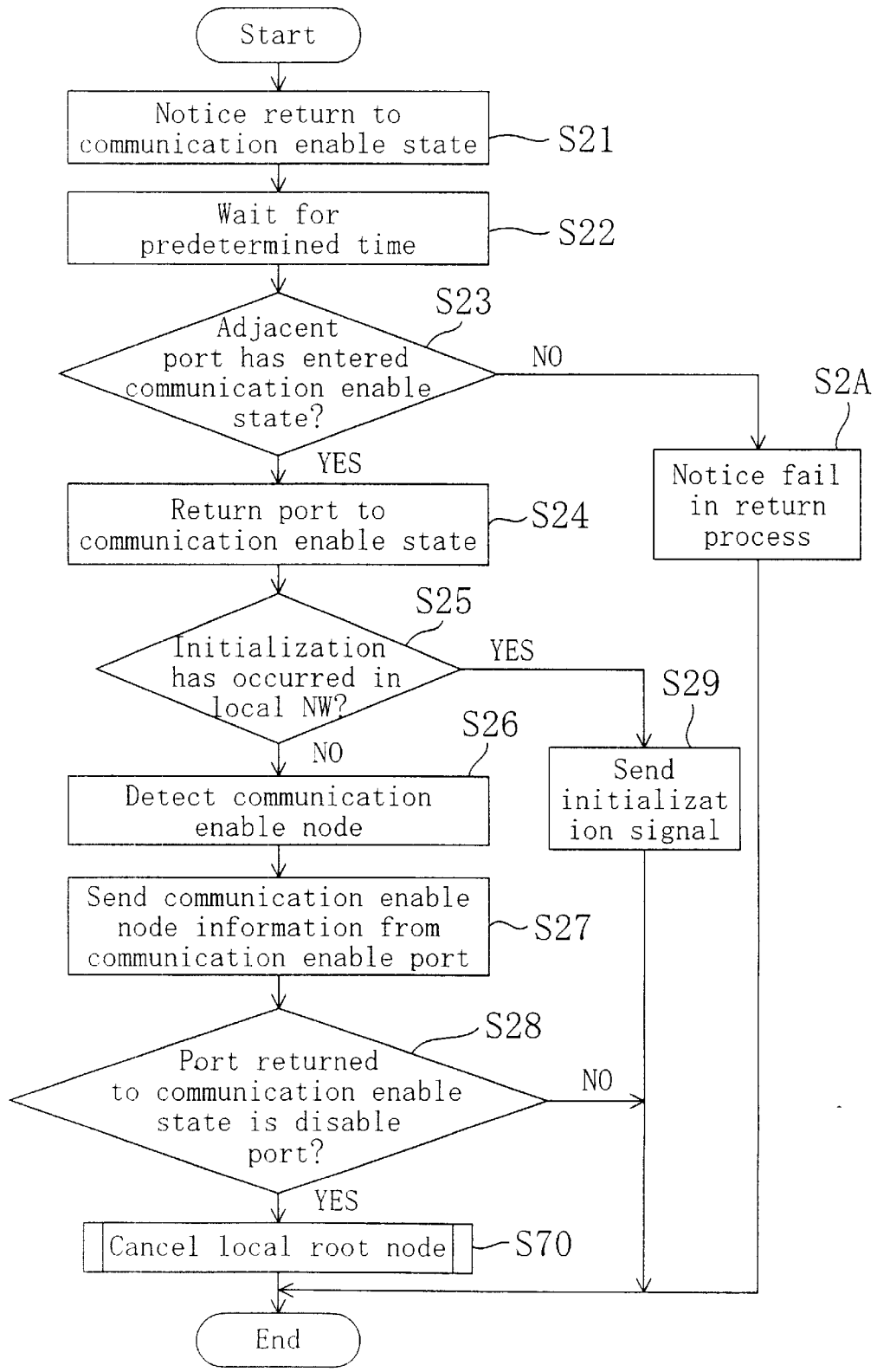
FIG. 4 is a flowchart for showing detailed procedures in a return process in the operation of a communications node according to the embodiment of the invention.

FIG. 4 is a flowchart for showing procedures in a return process, namely, a process for actively returning a port in a sleeping state to a communication enable state, in the operation of a communications node. When a request for returning to a communication enable state occurs, a communications node executes the return process shown in FIG. 4.

First, in step S21, the return to a communication enable state is noticed a port (adjacent port) of an adjacent node connected to the port to be returned to a communication enable state. This notice is sent by, for example, increasing a previously lowered electrical bias applied to a cable for connecting these ports to be larger than the predetermined value. Next, the procedure proceeds to step S22 for waiting for a predetermined period of time. A waiting time is set to a value sufficient for the adjacent node recognizing the notice of the return to a communication enable state and responding to this notice. After waiting for a predetermined period of time, it is determined in step S23 whether or not the adjacent port has entered a communication enable state. When the adjacent port has entered a communication enable state, the procedure proceeds to step S24, in which the port is returned to a communication enable state. When not, the procedure proceeds to step S2A, in which the fail of the return to a communication enable state is noticed the host, and the return process is completed.

After returning the port to a communication enable state in step S24, it is determined in step S25 whether or not initialization has occurred in a local network having included this communications node due to change of the bus architecture or power on/off of a communications node. Whether or not initialization has occurred in the local network is determined by referring an initialization occurrence flag (described in detail below). Herein, when an initialization occurrence flag has a value 1 (namely, when an initialization occurrence flag is set), it is determined that initialization has occurred in the local network.

When the initialization occurrence flag has a value 1, namely, when initialization has occurred in the local network, there is a possibility of change of the bus architecture, and it is necessary to conduct a bus reconstruction process for resetting node numbers and the like. Therefore, the procedure proceeds to step S29, in which the bus is reconstructed by sending a bus initialization signal from all communication enable ports. When initialization has not occurred in the local network, the procedure proceeds to step S26.

In step S26, a communications node to which data can be transferred from the port placed in a communication enable state is detected as a communication enable node. The detection of the communication enable node can be easily conducted based on the stored node information similarly to the detection of a communication disable node conducted in step S15 of the sleep process shown in FIG. 3. Then in step S27, the node number of the communication enable node detected in step S26 is sent as communication enable node information from a communication enable port other than the port returned to a communication enable state. A format of the communication enable node information can be, for example, a packet data including a header indicating that it is the communication enable node information and the node number of a communication enable node.

Next, it is determined in step S28 whether or not the port returned to a communication enable state is a disable port. When the port returned to a communication enable state is a disable port, namely, an original root port, a local root node should have been set in a local network having included this communications node. Therefore, when the port returned to a communication enable state is determined as a disable port, a "local root node canceling process" (described in detail below) is conducted, and then the return process is completed. On the other hand, when the port returned to a communication enable state is not a disable port, the return process is directly completed.

<Port Process>

Figure 5:
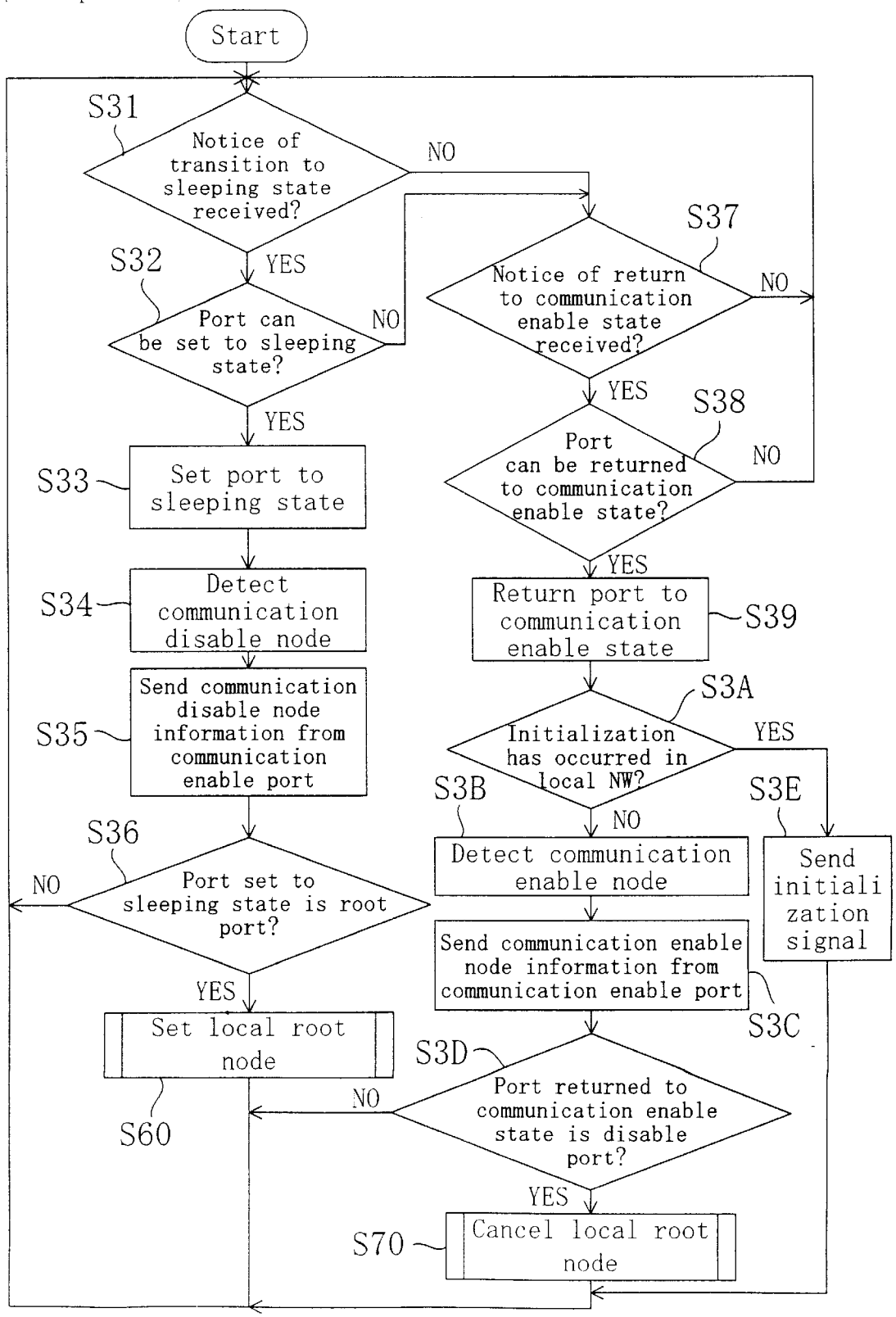
FIG. 5 is a flowchart for showing a port process in the operation of a communications node according to the embodiment of the invention.

FIG. 5 is a flowchart for showing procedures in a port process, namely, a process for monitoring whether or not each port receives notice of transition to a sleeping state or return to a communication enable state so as to conduct the necessary process in accordance with the notice, in the operation of a communications node. A communications node executes the port process shown in FIG. 5 with respect to each port thereof.

First, in step S31, it is determined whether or not a port has received notice of transition to a sleeping state. This determination is made, for example, by recognizing that the notice of transition to a sleeping state is received when an electrical bias previously applied to a cable for connecting the ports is smaller than a predetermined value and recognizing that the notice is not received when the electrical bias is larger than the predetermined value. When it is determined that the notice of transition to a sleeping state is received, the procedure proceeds to step S32, and when not, the procedure proceeds to step S37.

It is determined in step S32 whether or not the port can be set to a sleeping state. At this point, it is determined that the port cannot be set to a sleeping state when the port is already in a sleeping state or when the port is required to communicate with another node. In such cases, the procedure proceeds to step S37. In other cases, it is determined that the port can be set to a sleeping state, and the procedure proceeds to step S33, in which the port is set to a sleeping state.

When the port is set to a sleeping state in step S33, data cannot be transferred to communications nodes subsequent to this port. Therefore, a node to which data can be transferred from this port is detected as a communication disable node. The detection of the communication disable node can be easily realized on the basis of the stored node information similarly to the detection in step S15 in the sleep process shown in FIG. 3.

Then in step S35, the node number of the communication disable node detected in step S34 is sent as communication disable node information from a communication enable port other than the port set to a sleeping state. A format of the communication disable node information can be, for example, a packet data including a header indicating that it is the communication disable node information and the node number of a communication disable node.

Next, it is determined in step S36 whether or not the port set to a sleeping state is a root port. When the port set to a sleeping state is a root port, a local network including this communications node has no root node. Therefore, it is necessary to set a local root node for mediating arbitration occurring in the local network. Accordingly, when the port set to a sleeping state is determined as a root port, the procedure proceeds to step S60 for executing the "local root node setting process" (described in detail below), and the procedure returns to step S31. On the other hand, when the port set to a sleeping state is not a root port, the procedure directly returns to step S31.

When the port does not receive notice of transition to a sleeping state, it is determined in step S37 whether or not the port receives notice of return to a communication enable state. This determination is made by, for example, similarly to step S31, recognizing that the notice is received when the lowered electrical bias applied to the cable for connecting the ports is increased to exceed the predetermined value and recognizing that the notice is not received when the electrical bias remains to be smaller than the predetermined value. When the notice of return to a communication enable state is received, the procedure proceeds to step S38, and when not, the procedure returns to step S31.

It is determined in step S38 whether or not the port can be returned to a communication enable state. At this point, it is determined that the port cannot be returned to a communication enable state when the port has already been in a communication enable state or when the port cannot be returned to a communication enable state because the entire communications node including the port is placed in a sleeping state. In such cases, the procedure returns to step S31. In other cases, it is determined that the port can be returned to a communication enable state, and the procedure proceeds to step S39, in which the port is returned to a communication enable state.

After returning the port to a communication enable state in step S39, it is determined in step S3A whether or not initialization has occurred in the local network having included the communications node due to change of the bus architecture or power on/off of a communications node. Whether or not initialization has occurred in the local network is determined by referring an initialization occurrence flag (described in detail below). Herein, when an initialization occurrence flag has a value 1 (namely, when an initialization occurrence flag is set), it is determined that initialization has occurred in the local network.

When the initialization occurrence flag has a value 1, namely, when initialization has occurred in the local network, )there is a possibility of change of the bus architecture, and it is necessary to conduct a bus reconstruction process for resetting node numbers and the like. Therefore, the procedure proceeds to step S3E, in which the bus is reconstructed by sending a bus initialization signal from all communication enable ports. When initialization has not occurred in the local network, the procedure proceeds to step S3B.

In step S3B, a communications node to which data can be transferred from the port returned to a communication enable state is detected as a communication enable node. The detection of the communication enable node can be easily realized based on the stored node information similarly to the detection in step S26 of the return process shown in FIG. 4. In step S3C, the node number of the communication enable node detected in step S3B is sent as communication enable node information from a communication enable port other than the port returned to a communication enable state. A format of the communication enable node information can be, for example, a packet data including a header indicating that it is the communication enable node information and the node number of a communication enable node.

Next, it is determined in step S3D whether or not the port returned to a communication enable state is a disable port. When the port returned to a communication enable state is a disable port, namely, an original root port, a local root node should have been set in a local network having included this communications node. Therefore, when the port returned to a communication enable state is determined as a disable port, the "local root node canceling process" (described in detail below) is conducted, and then the procedure returns to step S31. On At the other hand, when the port returned to a communication enable state is not a disable port, the procedure directly returns to step S31.

<Initialization Occurrence Flag>

Figure 6:
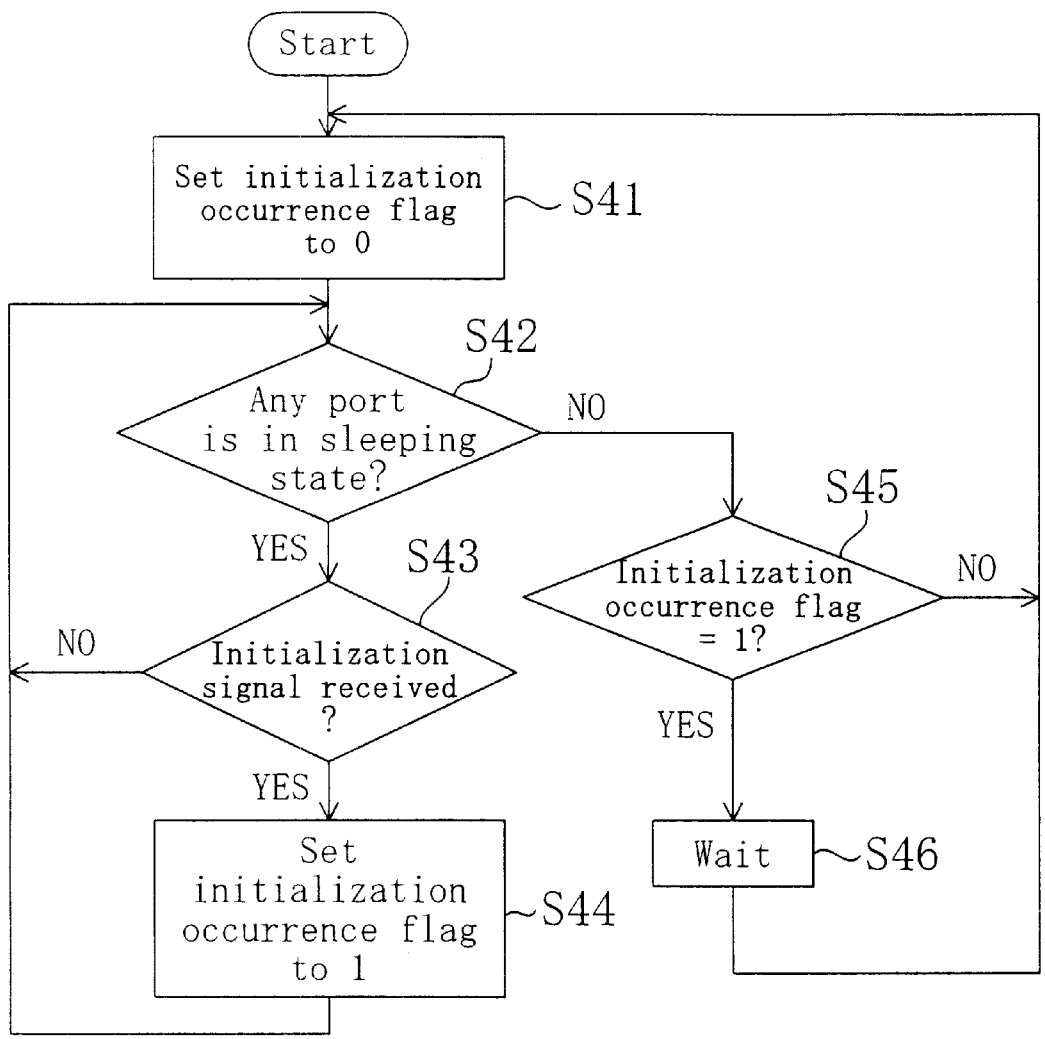
FIG. 6 is a flowchart for showing a process related to an initialization occurrence flag in the operation of a communications node according to the embodiment of the invention.

FIG. 6 is a flowchart for showing procedures in a process related to an initialization occurrence flag in the operation of a communications node. A communications node always executes the process related to an initialization occurrence flag shown in FIG. 6.

In step S41, the initialization occurrence flag is initialized to "0" (namely, the initialization occurrence flag is reset).

Next, it is determined in step S42 whether or not any of its own ports is in a sleeping state. When any port is in a sleeping state, the procedure proceeds to step S43, in which it is determined whether or not a bus initialization signal has been received at a communication enable port. When the bus initialization signal has been received, the initialization occurrence flag is set to "1" (namely, the initialization occurrence flag is set), and the procedure returns to step S42. When the bus initialization signal has not been received, the procedure directly returns to step S42. The procedures in steps S42 through S44 are repeatedly conducted while any of its ports is in a sleeping state.

When none of its ports is in a sleeping state, the procedure proceeds to step S45, in which it is determined whether or not the initialization occurrence flag is set to "1". When the initialization occurrent flag is set to "1", the procedure proceeds to step S46, so as to wait until the initialization signal is sent for reconstructing the bus architecture in step S29 of the return process of FIG. 4 or in step S3E of the port process of FIG. 5. When not, the procedure returns to step S81.

When the initialization occurrence flag is set to "1" in step S45, the communications node has received the initialization signal while any of its ports is in a sleeping state and the port in a sleeping state has been returned to a communication enable state. Therefore, normal completion of the procedure in step S29 of FIG. 4 or step S3E of FIG. 5 is waited for in step S46, and then the procedure proceeds to step S41, in which the initialization occurrence flag is reset.

<Communication Disable Node Information Receiving Process>

Figure 7:
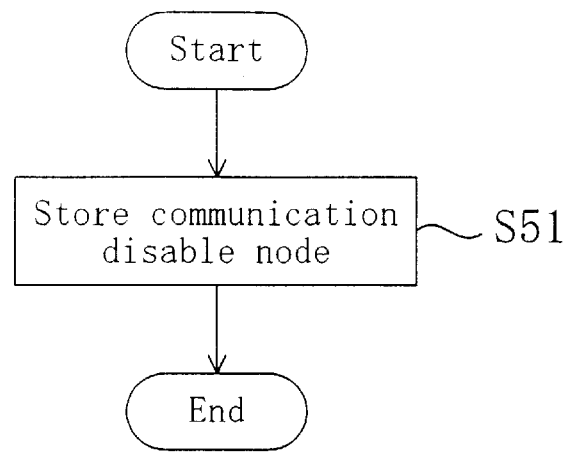
FIG. 7 is a flowchart for showing a communication disable node information receiving process in the operation of a communication node according to the embodiment of the invention.

FIG. 7 is a flowchart for showing procedures in a communication disable node information receiving process, namely, a process carried out in receiving the communication disable node information sent in step S16 of the sleep process shown in FIG. 3 or in step S35 of the port process shown in FIG. 5, in the operation of a communications node.

When a received data packet is communication disable node information, a communications node executes the communication disable node information receiving process. The received data packet can be easily determined as communication disable node information or not by monitoring the header information of the packet. In step S41, a communications node having received the communication disable node information stores the numbers of nodes having entered a communication disable state and stops communicating with these nodes.

<Communication Enable Node Information Receiving Process>

Figure 8:
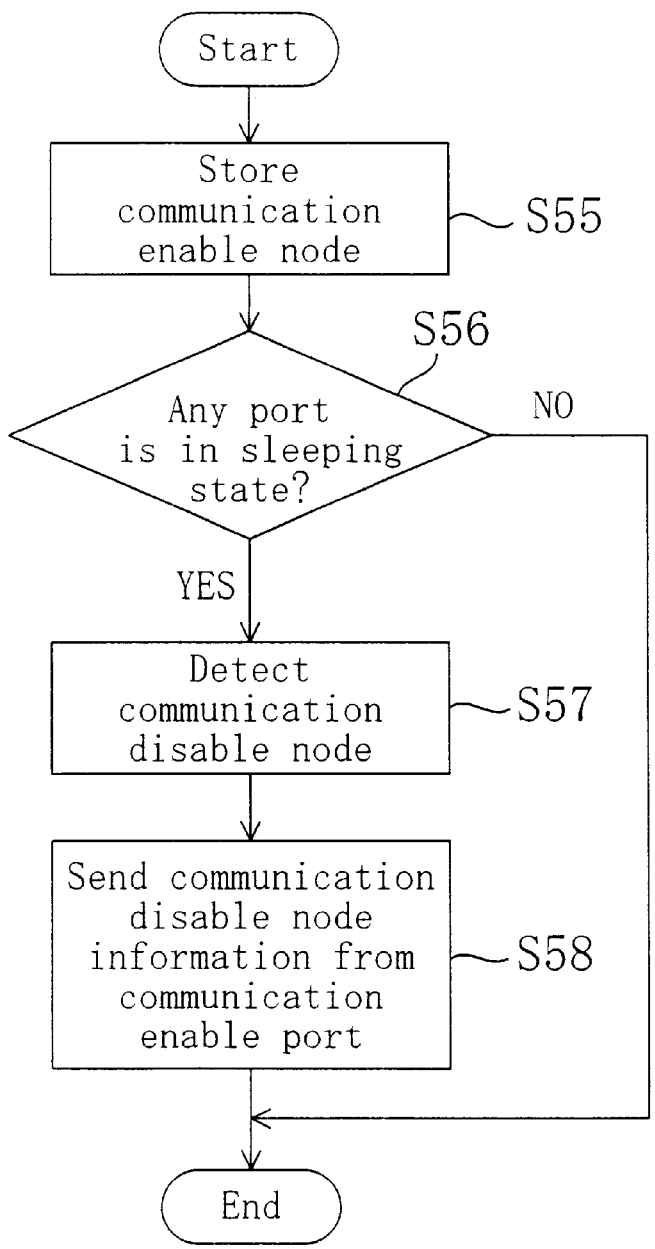
FIG. 8 is a flowchart for showing a communication enable node information receiving process in the operation of a communications node according to the embodiment of the invention.

FIG. 8 is a flowchart for showing procedures in a communication enable node information receiving process, namely, a process carried out in receiving communication enable node information sent in step S27 of the return process shown in FIG. 4 or in step S3C of the port process shown in FIG. 5, in the operation of a communications node.

When a received data packet is communication enable node information, a communications node executes the communication enable node information receiving process. The received data packet can be easily determined as communication enable node information or not by monitoring the header information of the packet.

In step S55, a communications node having received the communication enable node information stores the numbers of nodes having entered a communication enable state and allows to communicate with these nodes. Then, the procedure proceeds to step S56, in which it is determined whether or not any of its ports is in a sleeping state. When not, the process is directly completed.

When any port is in a sleeping state, the procedure proceeds to step S57, in which a node to which data can be transferred from this port in a sleeping state is detected as a communication disable node. Then, in step S58, the node number of the communication disable node detected in step S57 is sent as communication disable node information from a communication enable port other than the port in a sleeping state. The procedures in steps S57 and S58 can be executed in the same manner as in steps S15 and S16 of the sleep process shown in FIG. 3.

<Local Root Node Setting Process>

Figure 9:
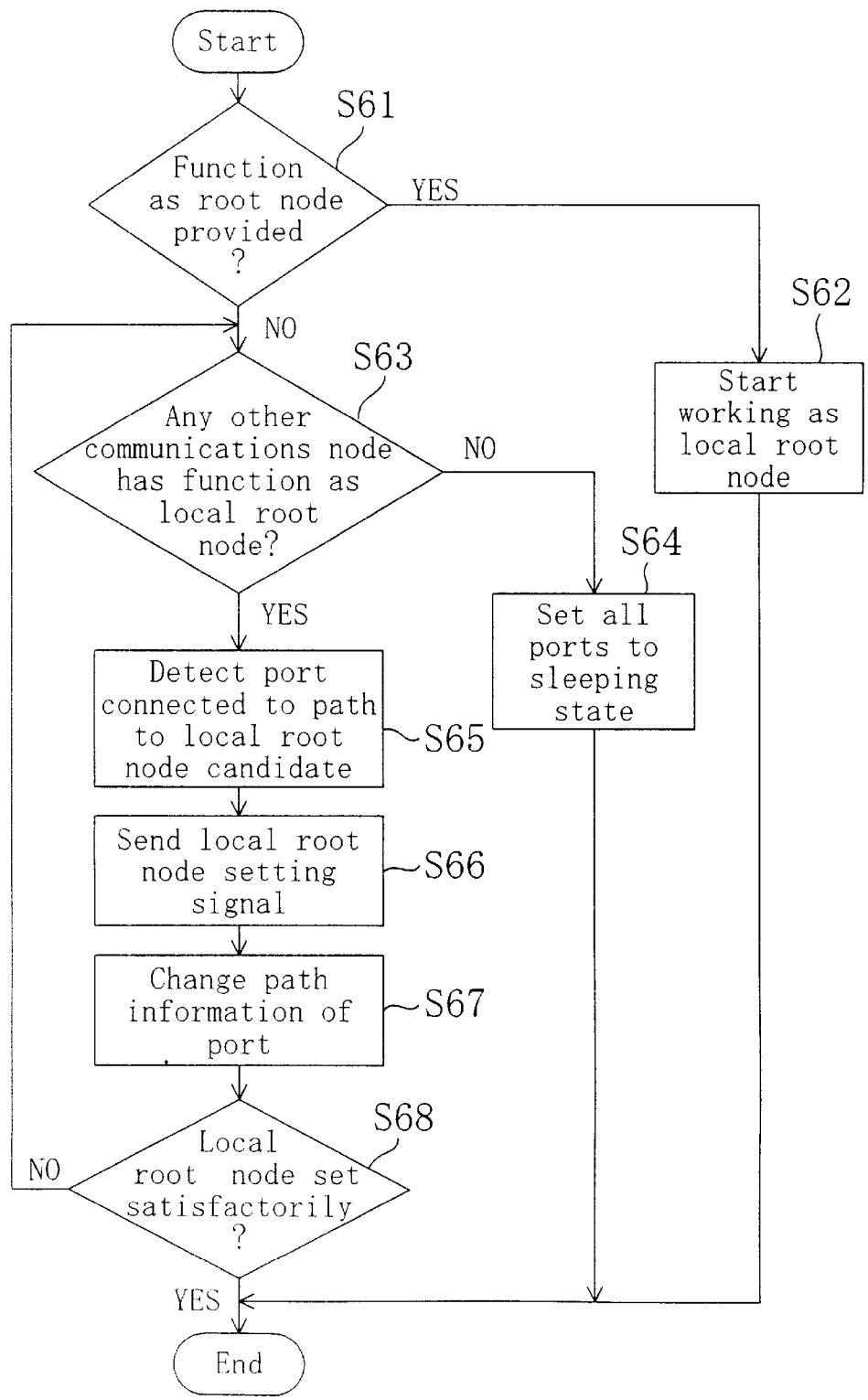
FIG. 9 is a flowchart for showing a local root node setting process in the operation of a communications node according to the embodiment of the invention.

FIG. 9 is a flowchart of the local root node setting process S60. When a port having been placed in a sleeping state is a root port, a communications node executes the local root node setting process S60.

First, in step S61, it is determined whether or not the communications node itself has a function as a root node. In general, notice of whether or not a communications node has a function as a root node is stored in a register or the like included in the communications node, and hence, this determination can be easily made. When the communications node has a function as a root node, the procedure proceeds to step S62, in which the communications node starts to work as a local root node, and the local root node setting process S60 is completed.

When the communications node does not have a function as a root node, the procedure proceeds to step S63. In step S63, a node having a function as a root node is searched for among nodes to which data can be transferred from communication enable ports of the communications node on the basis of the node information stored in initializing the network. When there is no node having a function as a root node, all the ports are set to a sleeping state in step S64, and the local root node setting process S60 is completed.

When there is a node having a function as a root node, the procedure proceeds to step S65, in which the node having a function as a root node is recognized as a local root node candidate and a port connected to a path to the local root node candidate is detected. Next, in step S66, the communications node sends a local root node setting signal for instructing the local root node candidate to start working as a root node of the local network. Furthermore, in step S67, the communications node updates path information of its ports. Specifically, the communications node recognizes the port detected in step S65 as a root port, and stops recognizing the original root port as a root port but recognizes it as a disable port.

A local root node setting signal preferably has higher priority than normal data transfer and is preferably transmitted by broadcast communication immediately after there arises necessity for determining a local root node, so that a node having received the local root node setting signal can be prevented from sending another local root node setting signal and that arbitration can be prevented from being started before determining a local root node.

Next, in step S68, it is determined whether or not a local root node has been successfully set. This determination can be made by any method, for example, a method in which a node directed to work as a local root node is made to send a response signal indicating that the node has started to work as a local root node, or a method in which the successful setting of a local root node is confirmed when a signal indicating communication disability is not received for a predetermined period of time.

When the local root node is successfully set in step S68, the local root node setting process S60 is completed. When the setting of the local root node has failed, the procedure returns to step S63, in which another local root node candidate is searched for.

<Local Root Node Setting Signal Receiving Process>

Figure 10:
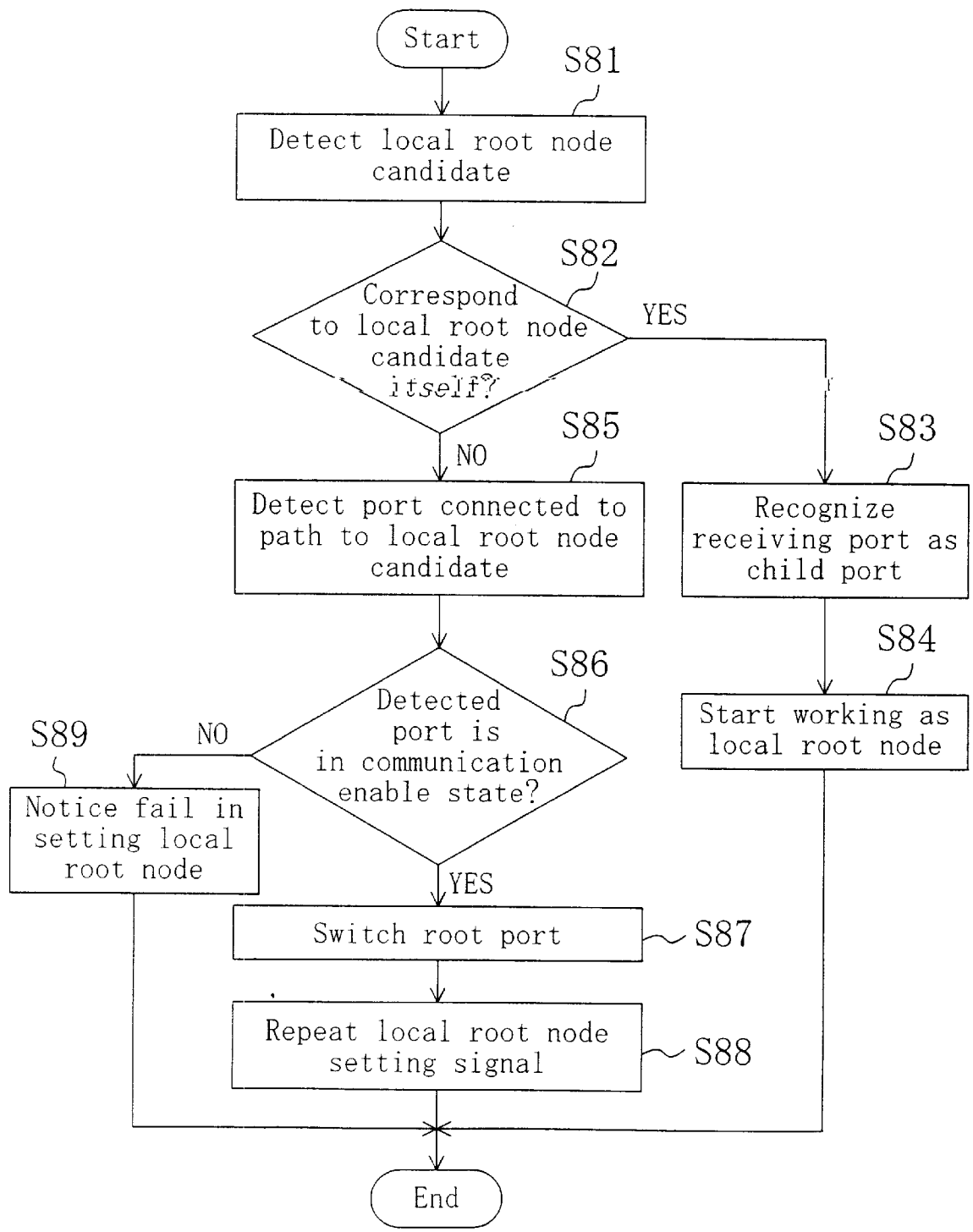
FIG. 10 is a flowchart for showing a local root node setting signal receiving process in the operation of a communications node according to the embodiment of the invention.

FIG. 10 is a flowchart of a local root node setting signal receiving process. When a communications node receives a local root node setting signal, the communications node executes the local root node setting signal receiving process of FIG. 10.

When a communications node receives a local root node setting signal, the communications node analyzes the received local root node setting signal so as to detect the node number of a local root node candidate in step S81. Next, in step S82, the communications node compares the node number detected in step S81 with its own node number.

When the node numbers accord with each other, the procedure proceeds to step S83, in which the communications node recognizes the port having received the local root node setting signal as a child port. Then, in step S84, the communications node starts to work as a local root node, and the local root node setting signal receiving process is completed.

When the node numbers do not accord with each other, the procedure proceeds to step S85, in which a port connected to a path to the local root node candidate is detected. In step S86, it is checked whether or not the port detected in step S85 is in a communication enable state.

When the detected port is in a communication enable state, the procedure proceeds to step S87, in which the root port is switched. Specifically, the detected port is recognized as a root port and the original root port is stopped to be recognized as a root port but recognized as a child port. Then, in step S88, the local root node setting signal is repeated to a port other than the port having received the local root node setting signal, and the local root node setting signal receiving process is completed.

When the detected port is not in a communication enable state, a signal for noticing fail in setting a local root node is sent, and the local root node setting signal receiving process is completed. The signal for indicating fail in setting a local root node is preferably sent by broadcast communication or sent to merely a port whose path information is updated in accordance with the local root node setting signal. When a communications node receives the signal for noticing fail in setting a local root node, the communications node should restore the path information of all its ports to the prior state.

<Local Root Node Canceling Process>

Figure 11:
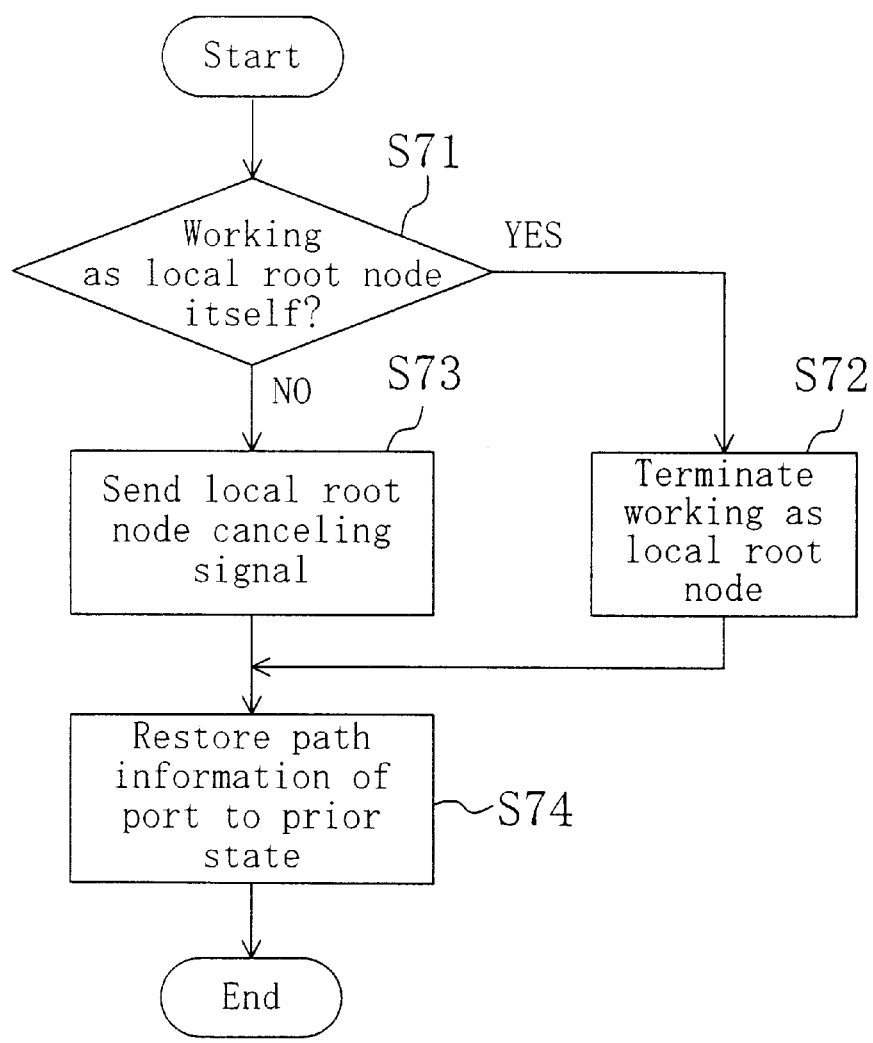
FIG. 11 is a flowchart for showing a local root node canceling access in the operation of a communications node according to the embodiment of the invention.

FIG. 11 is a flowchart of the local root node canceling process S70. When a port having been returned from a sleeping state to a communication enable state is a root port, a communications node executes the local root node canceling process S70.

First, in step S71, it is determined whether or not the communications node itself is a local root node. When the communications node is a local root node, the procedure proceeds to step S72, in which the communications node terminates working as a local root node and the local root node canceling process S70 is completed.

When the communications node itself is not a local root node, the procedure proceeds to step S73, in which a local root node canceling signal for instructing termination of the operation as a local root node is sent to a communication enable port excluding the port having been returned from a sleeping state to a communication enable state. The local root node canceling signal is preferably sent by broadcast communication. Ultimately in step S74, after restoring the path information of the ports to the prior state (specifically, the disable port is returned to a root port and when the communications node is not a local root node, the root port is returned to a child port), the local root node canceling process S70 is completed.

When a communications node receives a local root node canceling signal, the communications node should restore the path information of all its ports to the prior state.

(Exemplified Operation of Communications Node)

Now, specific operations of the respective communications nodes included in the network system of FIG. 1 will be described with reference to FIGS. 12(a) through 12(d) correspondingly to the procedures shown in the flowcharts of FIGS. 3 through 11.

First, a case where the node 3 sets the port 3a to a sleeping state will be described. In this case, the node 3 executes the sleep process of FIG. 3 and the node 4 executes the port process of FIG. 5.

First, the node 3 notices the transition to a sleeping state from the port 3a (step S11). When the node 4 receives the notice of the transition to a sleeping state at the port 4a (YES in step S31), it determines whether or not the port 4a can be placed in a sleeping state (step S32). Herein, it is assumed that the port 4a can be placed in a sleeping state (YES in step S32) so as to set the port 4a to a sleeping state (step S33). After waiting for a predetermined period of time (step S12), the node 3 recognizes that the adjacent port, namely, the port 4a, has entered a sleeping state (YES in step S13) and sets the port 3a to a sleeping state (step S14).

On the other hand, if the node 4 determines that the port 4a cannot be set to a sleeping state (NO in step S32), the port 4a does not enter a sleeping state. Therefore, after waiting for a predetermined period of time (step S12), the node 3 recognizes that the adjacent port, namely, the port 4a, has not entered a sleeping state (NO in step S13), and halts the transition of the port 3a to a sleeping state.

After setting the port 3a to a sleeping state, the node 3 detects nodes to which data can be transferred from the port 3a as communication disable nodes (step S15). In this case, the nodes to which data can be transferred from the port 3a are nodes 4, 5 and 6, and hence, "4", "5" and "6" are detected as the node numbers of the communication disable nodes. The node 3 sends the detected node numbers of the communication disable nodes as communication disable node information DN1 from a communication enable port other than the port 3a, namely, the port 3b (step S16). As a result, the nodes 1 and 2 receive the communication disable node information DN1 and recognize that they cannot communicate with the nodes 4, 5 and 6 so as to stop communicating with the nodes 4, 5 and 6.

Figure 12A:
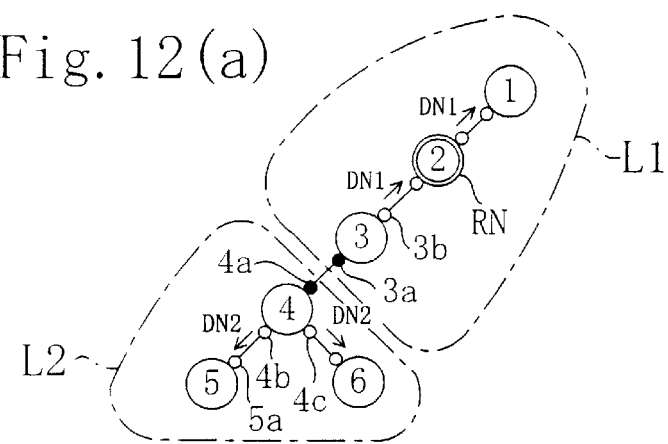
FIGS. 12(a) through 12(d) are diagrams for showing a specific operation of a communications node according to the embodiment of the invention.

On the other hand, after setting the port 4a to a sleeping state, the node 4 similarly detects nodes to which data can be transferred from the port 4a as communication disable nodes (step S34). In this case, the nodes to which data can be transferred from the port 4a are nodes 1, 2 and 3, and hence, "1", "2" and "3" are detected as the node numbers of the communication disable nodes. The node 4 sends the detected node numbers of the communication disable nodes as communication disable node information DN2 from communication enable ports other than the port 4a, namely, the ports 4b and 4c (step S35). As a result, the nodes 5 and 6 receive the communication disable node information DN2 and recognize that they cannot communicate with the nodes 1, 2 and 3 so as to stop communicating with the nodes 1, 2 and 3 (as shown in FIG. 12(a)).

As a result of the aforementioned operations, the nodes 1, 2 and 3 together form a first local network L1 and the nodes 4, 5 and 6 together form a second local network L2.

Then, the nodes 3 and 4 respectively determine whether or not the ports 3a and 4a having been placed in a sleeping state are root ports (steps S17 and S36). In this case, the port 3a is not a root port (NO in step S17), and hence, the node 3 directly completes the sleep process. On the other hand, since the port 4a is a root port (YES in step S36), the node 4 executes the local root node setting process S60, so as to determine a local root node for mediating arbitration in the second local network L2 formed by the nodes 4, 5 and 6.

Figure 12B:
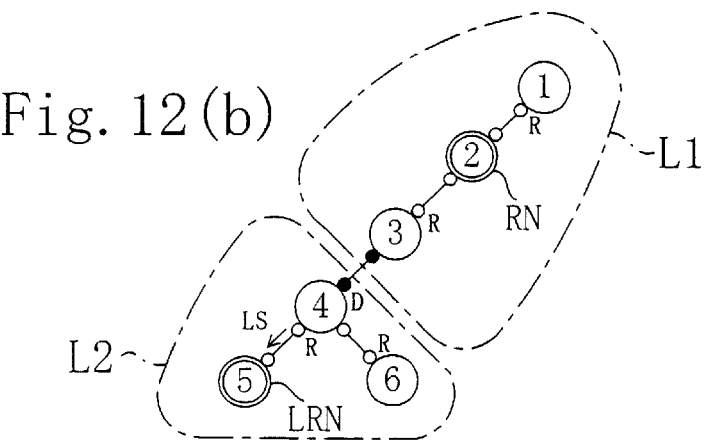

Herein, it is assumed that the node 5 has a function as a root node and that the nodes 4 and 6 do not have a function as a root node. The node 4 recognizes that the node 5 has a function as a root node on the basis of the node information received in initializing the bus. Therefore, the node 4 determines the node 5 as a local root node candidate, and sends a local root node setting signal LS to the node 5 from the port 4b. At this point, the node 4 changes the path information of the port 4b from a child port to a root port. The node 5 having received the local root node setting signal LS recognizes that the node 5 itself is a local root node candidate. Therefore, the node 5 changes the path information of the port 5a at which the signal has been received from a root port to a child port, and starts to work as a local root node LRN (as shown in FIG. 12(b)).

If none of the nodes 4, 5 and 6 has a function as a root node, the local root node cannot be determined. In this case, data transfer cannot be carried out in the second local network L2 formed by the nodes 4, 5 and 6 because bus arbitration cannot be mediated therein. In such a case, the node 4 determines that the setting of a local root node has failed, and sets all of its ports in a sleeping state. In this manner, power consumption can be reduced.

Next, a case where the node 4 returns the port 4a to a communication enable state from the state shown in FIG. 12(b) will be described. In this case, the node 4 executes the return process of FIG. 4 and the node 3 executes the port process of FIG. 5.

First, the node 4 notices return to a communication enable state from the port 4a (step S21). When the node 3 receives the notice of the return to a communication enable state at the port 3a (YES in step S37), it determines whether or not the port 3a can be returned to a communication enable state (step S38). Herein, it is assumed that the port 3a can be returned to a communication enable state (YES in step S38) so as to return the port 3a to a communication enable state (step S39). After waiting for a predetermined period of time (step S22), the node 4 recognizes that the adjacent port, namely, the port 3a, has returned to a communication enable state (YES in step S23), and returns the port 4a to a communication enable state (step S24).

On the other hand, if the node 3 determines that the port 3a cannot be returned to a communication enable state (NO in step S38), the port 3a does not enter a communication enable state. Therefore, after waiting for a predetermined period of time (step S22), the node 4 recognizes that the adjacent port, namely, the port 3a, has not entered a communication enable state (NO in step S23) and abandons the return of the port 4a to a communication enable state.

After returning the port 3a to a communication enable state, the node 3 determines whether or not initialization has occurred in the first local network Li having included the node 3 (step S3A). Similarly, after returning the port 4a to a communication enable state, the node 4 determines whether or not initialization has occurred in the second local network L2 having included the node 4 (step S25). Herein, it is assumed that initialization has occurred in neither the first local network L1 nor the second local network L2.

Thereafter, the node 3 detects nodes to which data can be transferred from the port 3a as communication enable nodes (step S3B). In this case, the nodes to which data can be transferred from the port 3a are nodes 4, 5 and 6, and hence, "4", "5" and "6" are detected as the node numbers of the communication enable nodes. The node 3 sends the detected node numbers of the communication enable nodes as communication enable node information EN1 from a communication enable port other than the port 3a, namely, the port 3b (step S3C). As a result, the nodes 1 and 2 receive the communication enable node information NE1 and recognize that they can communicate with the nodes 4, 5 and 6 so as to allow communication with the nodes 4, 5 and 6.

Figure 12C:
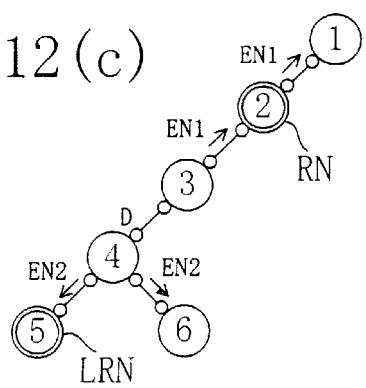

On the other hand, the node 4 similarly detects nodes to which data can be transferred from the port 4a as communication enable nodes (step S26). In this case, the nodes to which data can be transferred from the port 4a are nodes 1, 2 and 3, and hence "1", "2" and "3" are detected as the node numbers of the communication enable nodes. The node 4 sends the detected node numbers of the communication enable nodes as communication enable node information EN2 from communication enable ports other than the port 4a, namely, the ports 4b and 4c (step S27). As a result, the nodes 5 and 6 receive the communication enable node information EN2 and recognize that they can communicate with the nodes 1, 2 and 3 so as to allow communication with the nodes 1, 2 and 3 (as shown in FIG. 12(c)).

Through the aforementioned operations, the first local network L1 formed by the nodes 1, 2 and 3 and the second local network L2 formed by the nodes 4, 5 and 6 are both canceled.

Then, the nodes 3 and 4 respectively determine whether or not the ports 3a and 4a having been returned to a communication enable state are disable ports (steps S28 and S3D). In this case, the port 3a is not a disable port (NO in step S3D), and hence the node 3 does not execute the local root node canceling process but continues the port process. On the other hand, the port 4a is a disable port (YES in step S28), and hence the node 4 executes the local root node canceling process S70.

Figure 12D:
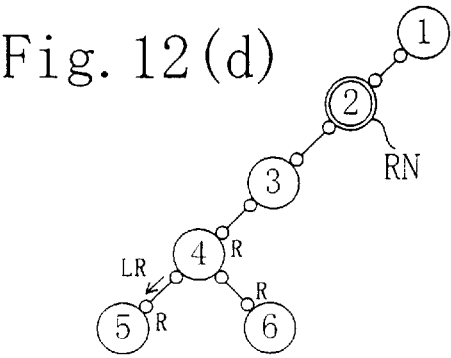

The node 4 sends a local root node canceling signal LR to the node 5 serving as the local root node LRN from the port 4b. In addition, the node 4 restores the path information of its ports to the prior state. As a result, the port 4a is returned to a root port and the port 4b is returned to a child port. In response to the local root node canceling signal LR, the node 5 restores the path information of the port 5a at which the signal LR has been received to the prior state. As a result, the port 5a is returned to a root port. Thereafter, the node TV 5 terminates working as a local root node (as shown in FIG. 12(d)).

(Other Exemplified Operations of Communications Node)

FIGS. 13(a) through 13(d) show other exemplified operations of the respective communications nodes according to this embodiment.

Figure 13A:
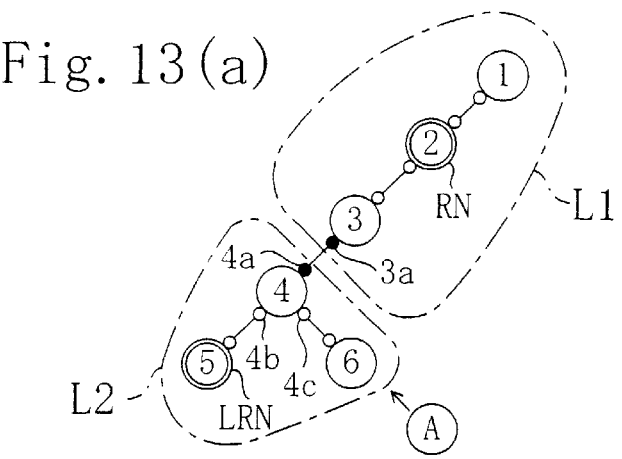
FIGS. 13(a) through 13(d) are diagrams for showing another specific operation of a communications node according to the embodiment of the invention.
Figure 13B:
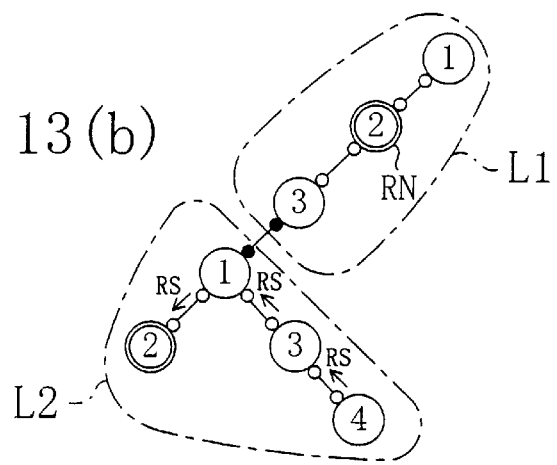

It is assumed that a node A is connected to the second local network L2 when the port 3a of the node 3 and the port 4a of the node 4 are placed in a sleeping state so as to form the first and second local networks L1 and L2 (as is shown in FIG. 13(a)). At this point, a network initialization signal RS is output from the node A so as to reset the second local network L2 and change the node numbers of the respective nodes included therein (as is shown in FIG. 13(b)).

In this case, while the port 4a is in a sleeping state (YES in step S42), the node 1 (the original node 4) receives the network initialization signal (YES in step S43), and hence, the node 1 sets an initialization occurrence flag (step S44).

Figure 13C:
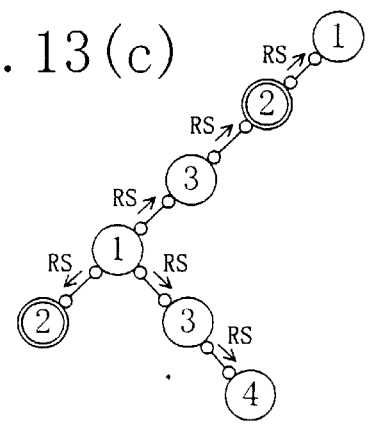
Figure 13D:
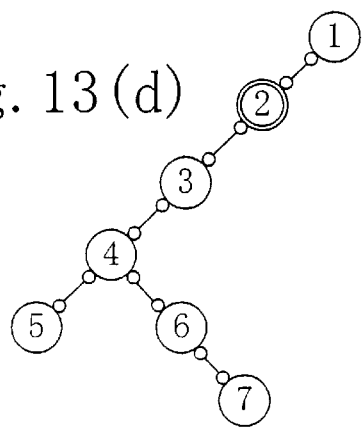

Herein, it is assumed that the node 1 (the original node 4) returns the port 4a to a communication enable state. After returning the port 4a to a communication enable state, the node 1 (the original node 4) determines whether or not initialization has occurred in the second local network L2 (step S25). In this case, since the initialization occurrence flag is set (YES in step S25), the node 1 (the original node 4) outputs a network initialization signal RS from all the communication enable ports 4a, 4b and 4c (step S29) (as shown in FIG. 13(c)). As a result, the entire network is rest, so as to change the node numbers of the respective nodes again (as is shown in FIG. 13(d)).

In a network system, bus initialization requires time several times as long as time required for data transfer. For example, according to IEEE 1394, in the case where sixty-three (the upper limit in IEEE 1394) communications nodes are present on a bus, bus initialization requires time of approximately 247 $\mu$s in total: approximately 167 $\mu$s in a reset noticing state for noticing all the nodes on the bus of the initialization; approximately 10 $\mu$s in a tree recognition state for determining parent-child relationships among the nodes and determining a root node; and approximately 70 $\mu$s in a node recognition state for each node to notice the other nodes of its information. In contrast, data transfer for transferring data of 1 kB at 100 Mbps takes approximately 80 µs.

Accordingly, wasteful waiting time can be remarkably reduced by avoiding unnecessary bus initialization in canceling a local network as in this embodiment.

Furthermore, bus initialization can spoil a real time data process. Specifically, when bus initialization is carried out during transfer of data requiring a real time process, such as speech and animation data, the data transfer is halted, resulting in breaking a sound or skipping a flame of the animation. Accordingly, a real time data process can be more effectively conducted by avoiding unnecessary bus initialization in canceling a local network as in this embodiment.

Figure 14A:
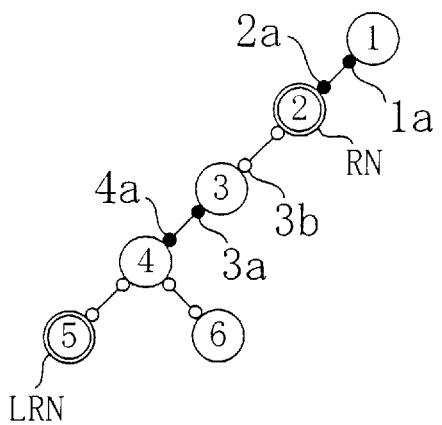
FIGS. 14(a) through 14(c) are diagrams for showing still another specific operation of a communications node according to the embodiment of the invention.
Figure 14B:
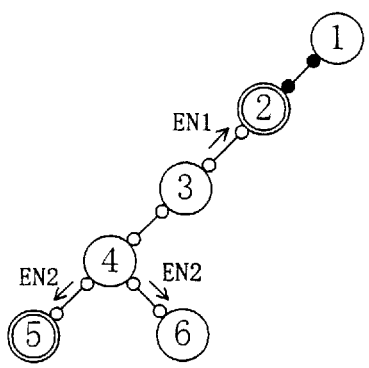
Figure 14C:
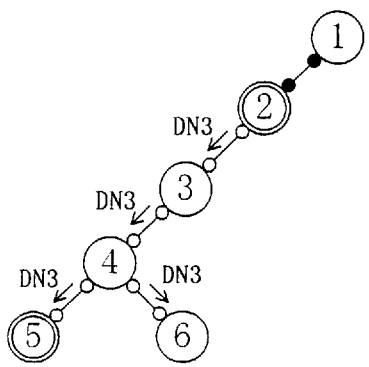

FIGS. 14(a) through 14(c) are diagrams for showing other exemplified operations of the respective communications nodes according to this embodiment.

It is assumed that the port 1a of the node 1 and the port 2a of the node 2 in addition to the port 3a of the node 3 and the port 4a of the node 4 has entered a sleeping state (as shown in FIG. 14(a)).

Herein, it is also assumed that the node 4 returns the port 4a to a communication enable state. After setting the port 4a to a communication enable state (step S24), the node 4 sends the communication enable node information EN2 from the ports 4b and 4c (step S27). Similarly, after setting the port 3a to a communication enable state, the node 3 sends the communication enable node information EN1 from the port 3b (step S3C) (as shown in FIG. 14(b)).

The node 2 having received the communication enable node information EN2 has the port 2a in a sleeping state (YES in step S56), and hence detects a node to which data can be transferred from the port 2a, namely, the node 1, as a communication disable node (S57). Then, the node 2 sends "1", that is, the node number of the communication disable node, as communication disable node information DN3 from the port 2b (step S58). The nodes 3, 4, 5 and 6 having received the communication disable node information DN3 stop communicating with the node 1 (as shown in FIG. 14(c)).

Needless to say, an initialization occurrence flag can be also used for recognizing the occurrence of initialization in a local network formed due to another factor.

Figure 15:
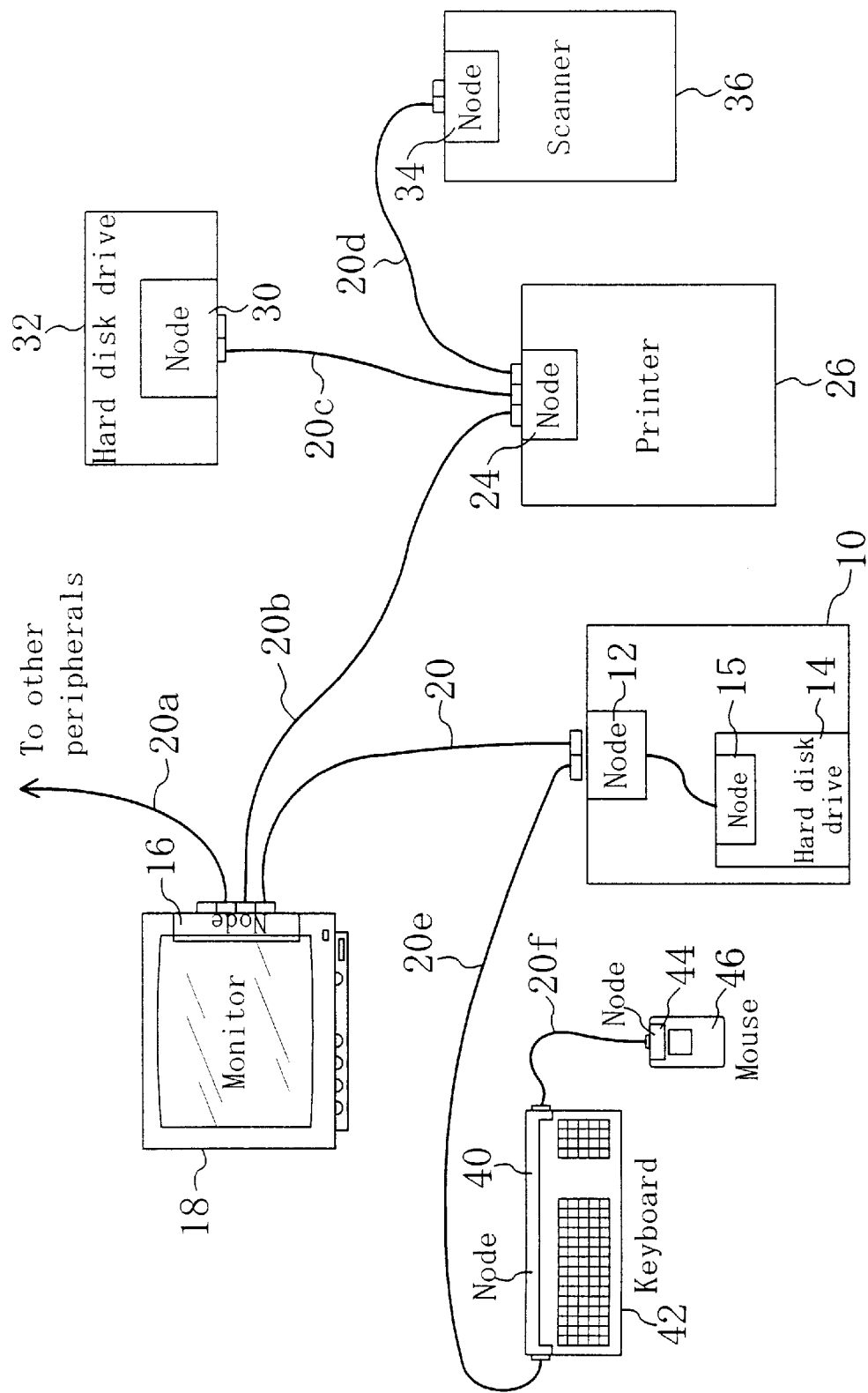
FIG. 15 is a diagram for showing an example of a computer environment utilizing a communications node according to the invention.

FIG. 15 is a diagram for showing an example of a computer environment utilizing a communications node according to the invention. In FIG. 15, a CPU 10 has a communications node 12, which is connected to a communications node 15 included in an internal hard disk drive 14. Also, a cable 20 connects the communications node 12 of the CPU 10 to a communications node 16 included in a monitor 18. Similarly, a cable 20a connects the communications node 16 of the monitor 18 to other peripheral equipment, and a cable 20b connects the communications node 16 of the monitor 18 to a communications node 24 of a printer 26. The communications node 24 of the printer 26 is connected to a communications node 30 included in a hard disk drive 32 through a cable 20c and to a communications node 34 included in a scanner 36 through a cable 20d. Furthermore, the communications node 12 of the CPU10 is connected to a communications node 40 included in a keyboard 42 through a cable 20e, and the communications node 40 of the keyboard 42 is connected to a communications node 44 of a mouse 46 through a cable 20f.

These communications nodes are respectively connected to equipment functioning as their local hosts. For example, the CPU 10 corresponds to the local host of the communications node 12, and the monitor 18 corresponds to the local host of the communications node 16.

Figure 16:
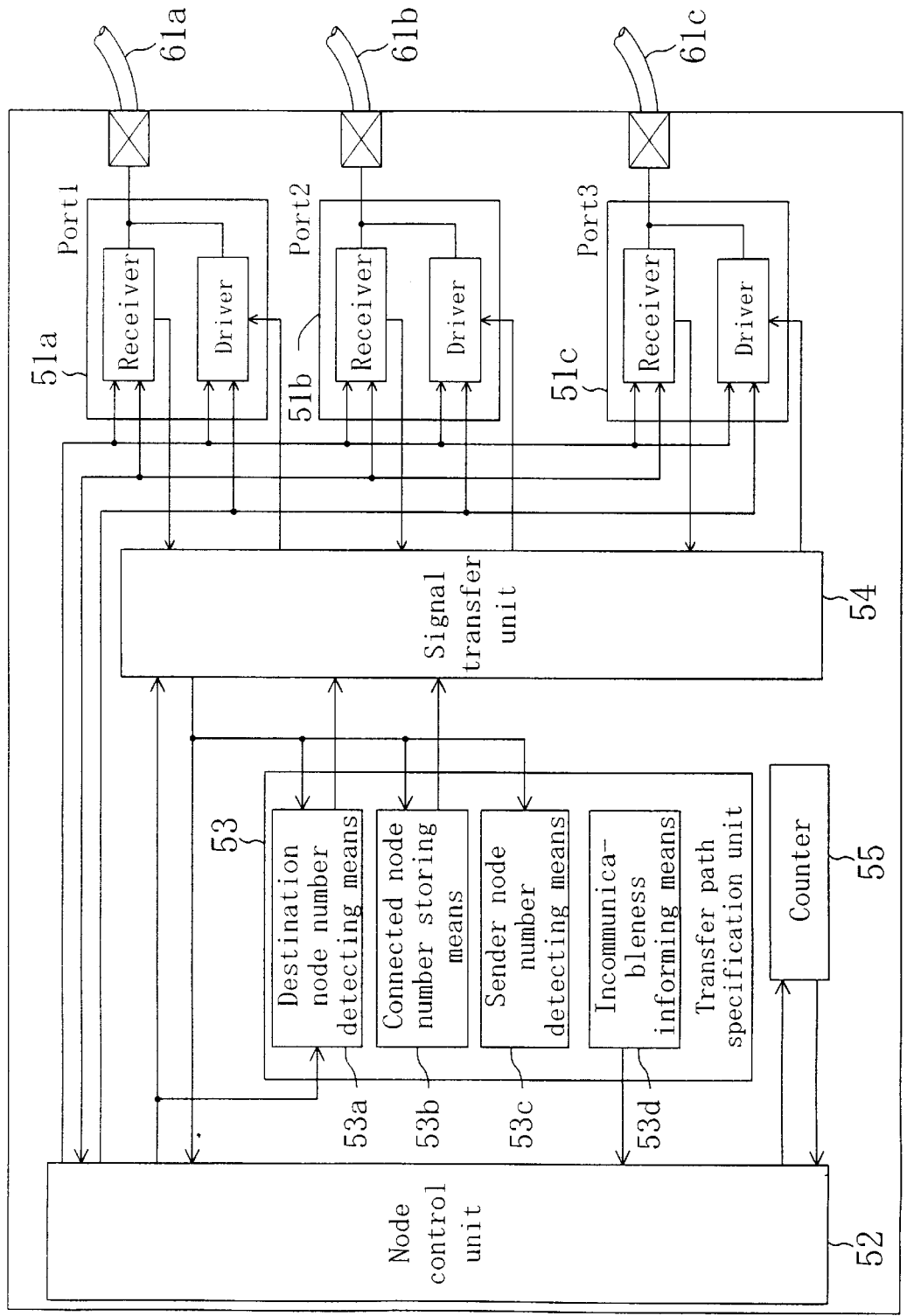
FIG. 16 is a diagram for showing an example of the internal configuration of a communications node.
Figure 17:
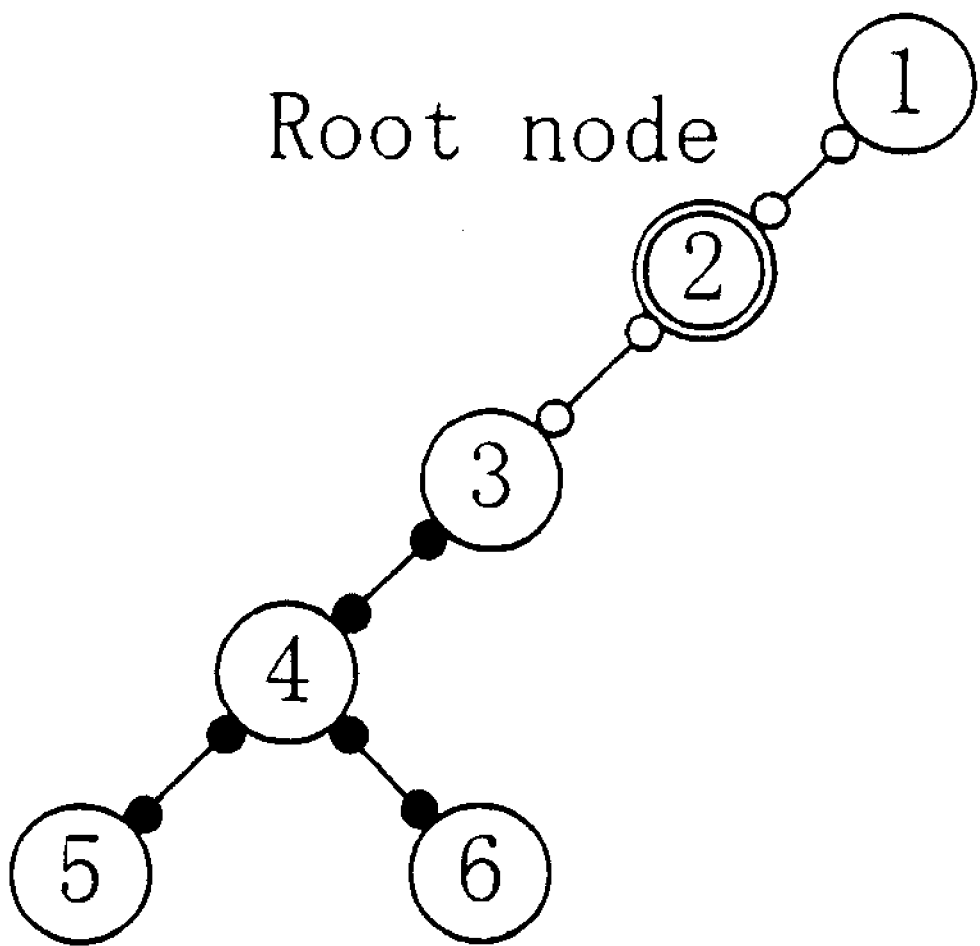
FIG. 17 is a diagram for showing a state where one communications node has entered a sleeping state in a conventional network.

FIG. 16 shows an example of the internal configuration of a communications node. In FIG. 16, ports 51a, 51b and 51c are connected to other communications nodes respectively through cables 61a, 61b and 61c for sending/receiving signals, and a node control unit 52 decodes an instruction from a host and a signal input through the port so as to conduct a process in accordance with predetermined protocol. Furthermore, a transfer path specification unit 53 specifies a transfer path of a signal, and includes means 53a for detecting a node number of the destination of a received signal, means 53b for storing the node numbers of communications nodes connected to the respective ports, means 53c for detecting the node number of the sender of a received signal, and means 53d for generating a signal indicating that a received signal is not transferable. A signal transfer unit 54 transfers a signal to a signal transfer path specified by the transfer path specification unit 53.

In this manner, according to the invention, in the case where a port of a given communications node enters a sleeping state, this communications node and a node to which data can be transferred from a port other than the port placed in a sleeping state together form a local network capable of independent internal data transfer. Therefore, the data transfer efficiency can be improved as compared with that attained by the conventional technique.

Furthermore, in the case where a local network is canceled because a port in a sleeping state has been returned to a communication enable state, network initialization is executed merely when the structure of the local network has been changed. Thus, unnecessary initialization can be avoided, resulting in improving the data transfer efficiency.

What is claimed is:

1. A communications node included in a network system comprising:
   a plurality of ports; and
   means for conducting, when notice of transition to a sleeping state is received at one of said ports or when one of said ports is to be set to a sleeping state, an operation for placing said port in a sleeping state and an operation for forming a local network capable of independent internal data transfer together with another node to which data is transferable from a port other than said sleeping port.

2. The communications node of claim 1,
   wherein said operation for forming said local network includes steps of:
   recognizing a node to which data is transferable from said sleeping port as a communication disable node; and
   sending a node number of said communication disable node from a port thereof other than said sleeping port as communication disable node information.

3. The communications node of claim 1,
   wherein said operation for forming said local network includes a step of:
   when said sleeping port is a root port, setting either said communications node or another node to which data is transferable from a port other than said sleeping port as a local root node for controlling arbitration in said local network.

4. The communications node of claim 3, further comprising means for setting all of said ports to a sleeping state when it is impossible to set a local root node.

5. The communications node of claim 1, further comprising means for conducting, when said sleeping port receives notice of return to a communication enable state or when said sleeping port is to be returned to a communication enable state, an operation for returning said sleeping port to a communication enable state and an operation for canceling said local network formed by said communications node and another node to which data is transferable from a port other than said sleeping port.

6. The communications node of claim 5,
wherein said operation for canceling said local network includes steps of:
   determining whether or not initialization has occurred while said local network is formed; and
   sending an initialization signal from all of said ports when it is determined that initialization has occurred and not sending an initialization signal when not.

7. The communications node of claim 6, further comprising an initialization occurrence flag to be set when another port receives said initialization signal while any port is in a sleeping state,
wherein, in said operation for canceling said local network, it is determined that initialization has occurred if said initialization occurrence flag is set and that initialization has not occurred if said initialization occurrence flag is not set.

8. The communications node of claim 5,
wherein said operation for canceling said local network includes steps of:
   recognizing a node to which data is transferable from said returned port as a communication enable node; and
   sending a node number of said communication enable node from a port other than said returned port as communication enable node information.

9. Information equipment comprising the communications node of claim 1 and having a structure connectable to a network system.

10. A network system comprising plural communications nodes,
wherein, when each of said communications nodes receives notice of transition to a sleeping state at a port thereof or when said communications node is to set a port thereof to a sleeping state, said communications node places said port in a sleeping state, and forms a local network capable of independent internal data transfer together with another node to which data is transferable from a port thereof other than said sleeping port.

11. The network system of claim 10,
wherein, in forming said local network, said communications node recognizes a node to which data is transferable from said sleeping port as a communication disable node and sends a node number of said recognized communication disable node from a port thereof other than said sleeping port as communication disable node information, and
each communications node receiving said communication disable node information stops communicating with said node having the node number included in said communication disable node information.

12. The network system of claim 10,
wherein, when each of said communications nodes receives notice of return to a communication enable state at a port thereof or when said communications node is to return a port thereof to a communication enable state, said communications node returns said port to a communication enable state, and cancels said local network formed together with another node to which data is transferable from a port thereof other than said returned port.

13. The network system of claim 12,
wherein, in canceling said local network, said communications node recognizes a node to which data is transferable from said returned port as a communication enable node, and sends a node number of said recognized communication enable node from a port thereof other than said returned port as communication enable node information, and
each communications node receiving said communication enable node information allows to communicate with said node having the node number included in said communication enable node information.

14. The network system of claim 13,
wherein each communications node receiving said communication enable node information determines whether or not any port thereof is a communication disable port, and
when any port thereof is a communication disable port, said communications node recognizes a node to which data is transferable from said communication disable port as a communication disable node, and sends a node number of said recognized communication disable node from a port thereof other than said communication disable port as communication disable node information.

* * * * *